United States Patent
Chen et al.

(10) Patent No.: US 11,392,610 B2
(45) Date of Patent: Jul. 19, 2022

(54) SCALABLE OBJECT STORAGE WITH INTELLIGENT REPLICATION

(71) Applicant: Red Hat, Inc., Raleigh, NC (US)

(72) Inventors: Huamin Chen, Westford, MA (US); Dennis R. C. Keefe, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 376 days.

(21) Appl. No.: 16/152,804

(22) Filed: Oct. 5, 2018

(65) Prior Publication Data

US 2020/0110830 A1    Apr. 9, 2020

(51) Int. Cl.
*G06F 16/27* (2019.01)
*G06F 16/22* (2019.01)

(52) U.S. Cl.
CPC .......... *G06F 16/27* (2019.01); *G06F 16/2255* (2019.01)

(58) Field of Classification Search
CPC .............................. G06F 16/27; G06F 16/2255
See application file for complete search history.

(56) References Cited

U.S. PATENT DOCUMENTS

| | | | |
|---|---|---|---|
| 8,185,497 B2 | 5/2012 | Vermeulen et al. | |
| 8,560,503 B1 | 10/2013 | McManis | |
| 9,612,749 B2 | 4/2017 | Wang | |
| 9,639,591 B2 | 5/2017 | Segev et al. | |
| 9,679,008 B2 | 6/2017 | Vosshall et al. | |
| 2006/0294163 A1* | 12/2006 | Armangau | G06F 16/13 707/999.205 |
| 2008/0177767 A1* | 7/2008 | Lin | H04L 12/4625 707/999.1 |
| 2014/0201170 A1* | 7/2014 | Vijayan | G06F 16/1748 707/692 |
| 2014/0279905 A1* | 9/2014 | Muniswamy-Reddy | G06F 16/27 707/639 |
| 2017/0091233 A1* | 3/2017 | Basham | G06F 16/122 |
| 2017/0123935 A1 | 5/2017 | Pandit et al. | |

OTHER PUBLICATIONS

Suzaki, Kuniyasu, et al., "Analysis of Disk Access Patterns on File Systems for Content Addressable Storage," Linux Symposium, 2011, pp. 23-36.
Wang, Dong, et al., "LevelStore: A Large Scale Key-value Store for Deduplication Storage System," Information Technology Journal, Research Article, vol. 12, Jul. 24, 2013, pp. 2101-2110.

* cited by examiner

*Primary Examiner* — Kannan Shanmugasundaram
(74) *Attorney, Agent, or Firm* — Dority & Manning, P.A.

(57) ABSTRACT

Scalable object storage with intelligent replication is disclosed. A container image storage system executing on one or more processor devices receives a container image comprising a plurality of objects. For each object, a reference count indicative of how many different container images stored in the container image storage system include the object is determined. For each object, a number of copies of the object to be stored in a storage based on the reference count is determined. For each object, the number of copies of the object are stored in the storage.

20 Claims, 7 Drawing Sheets

SCALABLE OBJECT STORAGE WITH INTELLIGENT REPLICATION

TECHNICAL FIELD

The examples relate generally to object storage, and in particular to scalable object storage with intelligent replication.

BACKGROUND

Different container images often contain one or more common layers. Certain types of storage, such as content addressable storage, operate to eliminate redundant copies of data. Backend object stores, such as those offered by increasingly popular cloud computing environments, often include constraints that effectively limit the number of accesses, such as read or write accesses, of an object in the object store over a predetermined period of time.

SUMMARY

The examples implement scalable object storage with intelligent replication in the context of a container image storage system. Even though multiple different container images may include a copy of a same object, the container image storage system generally maintains a single copy of the object in an object store to reduce storage usage in the object store. However, under certain conditions, the container image storage system may create one or more object copies of an object in the object store to facilitate concurrent accesses of the object copies in response to concurrent requests for the object from an external service, such as a container orchestration system, thereby eliminating bottlenecks that may otherwise occur when multiple concurrent accesses of a single copy of an object are made.

In one example a method is provided. The method includes receiving, by a container image storage system executing on one or more processor devices, a container image comprising a plurality of objects. The method further includes, for each object, determining a reference count indicative of how many different container images stored in the container image storage system include the object. The method further includes, for each object, determining a number of copies of the object to be stored in a storage based on the reference count. The method further includes, for each object, causing the number of copies of the object to be stored in the storage.

In another example a system is provided. The system includes one or more memories and one or more processor devices coupled to the one or more memories to receive, by a container image storage system executing on the one or more processor devices, a container image comprising a plurality of objects. The one or more processor devices are further to, for each object, determine a reference count indicative of how many different container images stored in the container image storage system include the object. The one or more processor devices are further to, for each object, determine a number of copies of the object to be stored in a storage based on the reference count. The one or more processor devices are further to, for each object, cause the number of copies of the object to be stored in the storage.

In another example a computer program product is provided. The computer program product is stored on a non-transitory computer-readable storage medium and includes instructions to cause one or more processor devices to receive, by a container image storage system executing on the one or more processor devices, a container image comprising a plurality of objects. The instructions further cause the one or more processor devices to, for each object, determine a reference count indicative of how many different container images stored in the container image storage system include the object, determine a number of copies of the object to be stored in a storage based on the reference count, and cause the number of copies of the object to be stored in the storage.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

The accompanying drawing figures incorporated in and forming a part of this specification illustrate several aspects of the disclosure and, together with the description, serve to explain the principles of the disclosure.

DETAILED DESCRIPTION

Figure 1A:
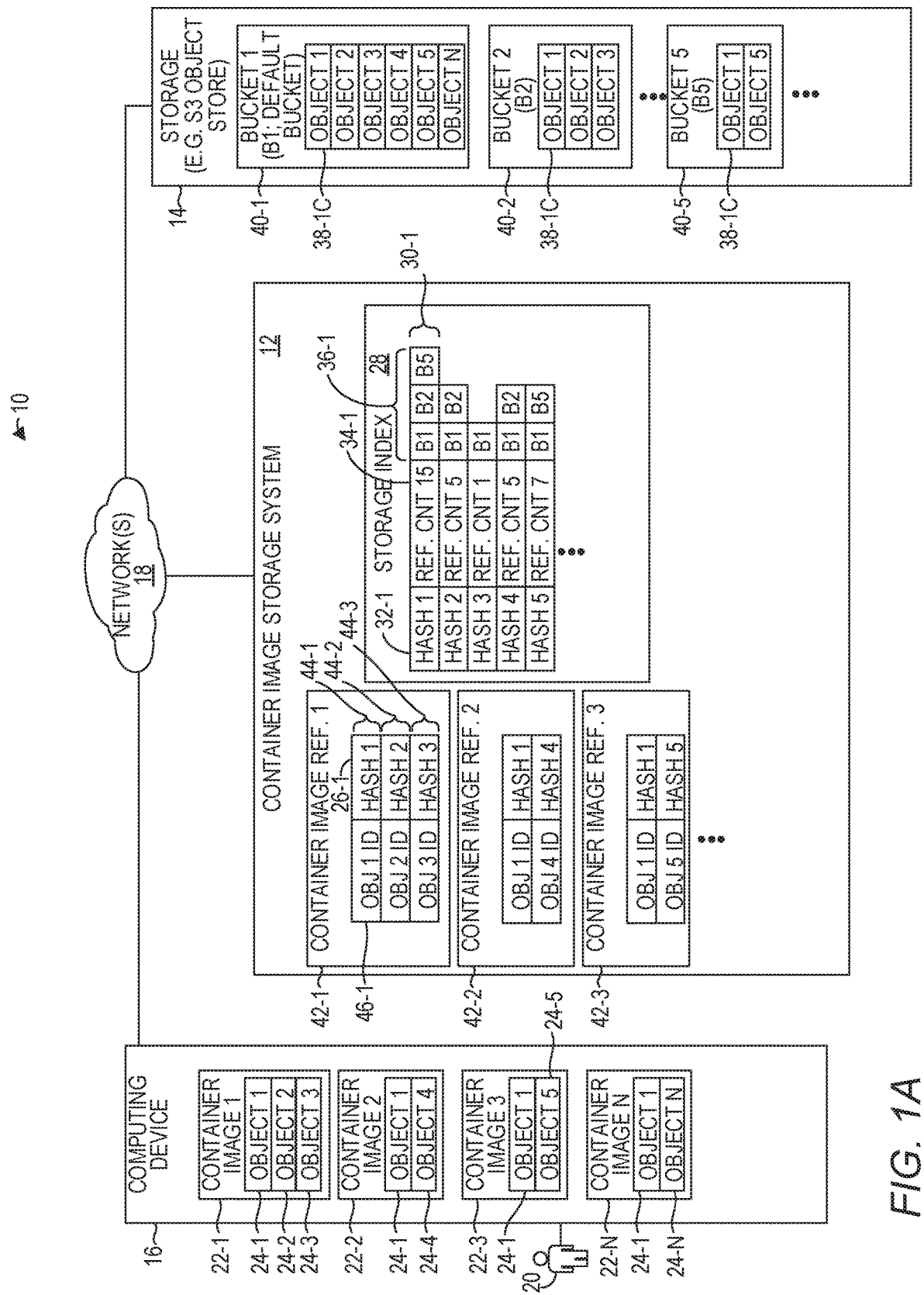
FIG. 1A is a block diagram of an environment suitable for scalable object storage with intelligent replication according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

The term "container image" as used herein refers to a software package generated by a containerization technology, such as, by way of non-limiting example, a Docker container technology, a Kubernetes container technology, a CoreOS (Rocket) container technology, a Tectonic container technology, and the like, which contains a plurality of layers and from which a runtime container can be initiated.

Each layer is generated in response to a command used during a build process of the container image. The layers may contain, for example, data files, executable files, commands that are to be executed when a container is initiated from the container image, and the like. Each container image typically differs from other container images, and contains those resources necessary for the respective container image to implement a desired functionality. However, different container images often have one or more common layers, and thus may have contain portions that are identical to one another, although the different container images provide completely different functionality.

Container images are often stored in a container store, such as a container image registry, and from which container images can be obtained on demand. For example, container orchestrator technologies may automatically obtain container images from a container image registry and initiate corresponding containers in response to dynamic runtime conditions associated with a service.

To efficiently utilize storage, some examples disclosed herein utilize a content addressable storage mechanism that eliminates redundant storage of common objects that are shared among multiple container images. However, some storage facilities, including certain cloud computing environment storage facilities, require that storage be organized in units, such as buckets, or folders, upon which the storage facility may place access constraints. Thus, while any number of objects may be able to be stored in a bucket, the storage facility limits a number of accesses to the bucket that can be made within a predetermined period of time. As an example, a storage facility may limit a bucket to 100 reads per second. After 100 reads, the bucket will not be accessible until the next one-second time period begins. In a large scale environment with hundreds or thousands of containers, many of which may share common layers, this type of limitation can result in delays which ultimately cause user dissatisfaction. While one solution would be to put each object in a separate bucket, each bucket may incur additional costs, such that a minimum number of buckets is desirable from an operational standpoint.

The examples disclosed herein implement scalable object storage with intelligent replication in a container image storage system. The examples, based on a reference count indicative of how many different container images stored in a container image storage system include an object, cause a particular number of copies of the object to be stored in an object store. Among other advantages, the examples implement a highly scalable yet efficient container image storage system.

The examples disclosed herein will be discussed in two stages, a container image storage stage, and a container image retrieval stage. However, it should be noted that, in practice, the container image storage system disclosed herein is relatively concurrently both storing container images and sending container images in response to retrieval requests. FIG. 1A is a block diagram of an environment 10 suitable for scalable object storage with intelligent replication according to some examples. The environment 10 includes a container image storage system 12, a storage 14, a computing device 16, and a network 18 that facilitates communications between components in the environment 10. A user 20, such as a software developer, for example, interacts with the computing device 16 to generate one or more container images 22-1, 22-2, 22-3, and 22-N (generally, container images 22). Each container image 22 includes one or more objects 24-1-24-N (generally, objects 24). The term "object" as used herein encompasses any divisible unit of a container image, such as a layer of a container image, or a block of a layer of a container image. While for purposes of illustration and simplicity the container images 22 are illustrated as having only a few objects 24, in examples where the objects 24 correspond to physical blocks, the container images 22 may include thousands or even millions of objects 24.

Note that many of the container images 22 contain a same object 24. For example each of the container images 22-1, 22-2, 22-3, and 22-N includes the object 24-1. On the computing device 16, each of the objects 24-1 contained in each individual container image 22-1 is a separate copy, and thus, depending on the physical size of the object 24-1, the object 24-1 may require a substantial amount of storage space or memory. Similarly, the container images 22-1 and 22-N each include the object 24-1.

The user 20 may choose to save one or more of the container images 22 to the container image storage system 12. This may facilitate the use of such container images 22 in a production environment, for example. At the point in time illustrated in FIG. 1A, the user 20 has stored the container images 22-1, 22-2, and 22-3 in the container image storage system 12. The container image storage system 12 executes on one or more processor devices associated with one or more computing devices (not shown in FIG. 1A for purposes of simplicity, but illustrated below with regard to FIG. 5).

When the container image storage system 12 receives a container image 22, such as the container image 22-1, the container image storage system 12 initiates certain processing to facilitate subsequent retrieval of the container image 22, and to reduce an amount of storage space required to store the container image 22, where practical. In some examples, the container image storage system 12 works in conjunction with an externally provided storage facility, such as the storage 14, in which copies of the objects 24 may be stored. The storage 14 may, for example, be a third party storage facility offered by a cloud computing provider, such as, by way of non-limiting example, an Amazon S3 storage facility.

The storage 14 requires that storage of objects be organized in units, referred to herein as buckets. The term "buckets" as used herein refers to any storage mechanism by which the storage 14 may organize the objects, including, by way of non-limiting example, folders, or any other suitable organization mechanism. The storage 14 imposes access constraints on the buckets in terms of the number of accesses, such as reads or writes, that may be made to a bucket over a predetermined period of time, such as, by way of non-limiting example, one second. As an example, the storage 14 may limit each bucket to 100 accesses during a one-second time period. In some environments, such access constraints can cause delays where the attempted number of accesses to obtain objects stored in a bucket exceed the access limits for the bucket.

To illustrate aspects of the disclosed examples, the storing of the container image 22-1 in the container image storage system 12 during the container image storage stage will be discussed. The container image storage system 12 may offer the user 20 a user interface to facilitate storing a container image 22 in the container image storage system 12. Assume, for purposes of illustration, the user 20 has utilized such a user interface to direct the container image storage system 12 to store the container image 22-1. The container image storage system 12 receives the container image 22-1, extracts the first object 24-1, and generates a hash 26-1 based on the contents of the object 24-1. The hash 26-1 is a fixed-length bit pattern generated by a hash algorithm based on the content of the thing being hashed, in this example, the object 24-1. Each hash 26 is unique for each unique object 24. Two identical objects 24 will result in two identical hashes 26. Any suitable hashing algorithm may be used, such as, by way of non-limiting example, the SHA or MD5 hashing algorithms.

The container image storage system 12 searches a storage index 28 using the hash 26-1 to determine whether the container image storage system 12 has previously received a container image 22 that included the object 24-1. The container image storage system 12 locates a storage index entry 30-1 that includes a hash 32-1 that matches the hash 26-1. The existence of the storage index entry 30-1 with the hash 32-1 that matches the hash 26-1 means that the container image storage system 12 has previously stored the object 24-1 in the storage 14. The container image storage system 12 increments a reference count 34-1 indicative of how many different container images 22 stored in the container image storage system 12 include the object 24-1. For purposes of illustration, assume that with the addition of the container image 22-1 to the container image storage system 12, the reference count 34-1 now has a value of 15. The container image storage system 12, based on the reference count 34-1, determines a number of copies of the object 24-1 that should be stored in the storage 14. The container image storage system 12 may utilize any desired algorithm for determining the number of copies of an object 24 that should be stored in the storage 14 based on the value of the reference count 34-1. In some examples, the reference count 34-1 may be divided by a predetermined number, such as five or ten, and the resulting sum may indicate the number of copies of the object 24 that should be stored in the storage 14. In other examples, the container image storage system 12 may utilize a logarithmic function to determine the number of copies of the object 24 that should be stored in the storage 14. The base of the logarithmic function may be selected based on a desired balance between storage utilization in the storage 14 and ensuring that the object 24 can be quickly retrieved upon request.

In this example, the container image storage system 12 utilizes a logarithmic function having a base of 2 to determine the number of copies of the object 24 that should be stored in the storage 14. In particular, the container image storage system 12 may use the following formula:

number of copies=$\log_2$(reference count 34-1)
number of copies=$\log_2$(15)
number of copies=3.9

The container image storage system 12 may truncate any fractional portion and thus, in this example, determine that the desired number of copies of the object 24 in the storage 14 is three. The container image storage system 12 accesses a list 36-1 that identifies a set of three buckets B1 (bucket 40-1), B2 (bucket 40-2), and B5 (bucket 40-5) in which object copies 38-1C of the object 24-1 have been stored.

Because three object copies 38-1C of the object 24-1 already exist in the storage 14, the container image storage system 12 determines that no additional object copy 38-1C of the object 24-1 in the storage 14 is necessary. As will be discussed in greater detail below, the existence of the three object copies 38-1C of the object 24-1 facilitates a larger number of concurrent accesses for an object copy 38-1C of the object 24-1 than would be possible with fewer object copies 38-1C. However, costs associated with the storage 14 may in part be determined based on the number of buckets 40 used as well as the aggregate storage space used by the object copies 38-1C, and thus the container image storage system 12 balances the number of object copies 38-1C stored in the storage 14 with the likelihood of concurrent accesses of such object copies 38-1C based on the reference count 34-1.

The container image storage system 12 generates a container image reference 42-1 which corresponds to the container image 22-1. The container image storage system 12 generates an image reference record 44-1 which includes the hash 26-1 and an object identifier 46-1 that uniquely identifies the object 24-1. The container image storage system 12 implements similar processing for the objects 24-2 and 24-3 of the container image 22-1, resulting in the generation of image reference records 44-2 and 44-3 in the container image reference 42-1. Note that similar processing takes place with respect to the storage of the container images 22-2 and 22-3 in the container image storage system 12 resulting in the generation of container image references 42-2 and 42-3, respectively. Note that the data illustrated in the storage index 28 are based on additional container image references 42 which, for purposes of simplicity and illustration, are not depicted in FIG. 1A.

Figure 1B:
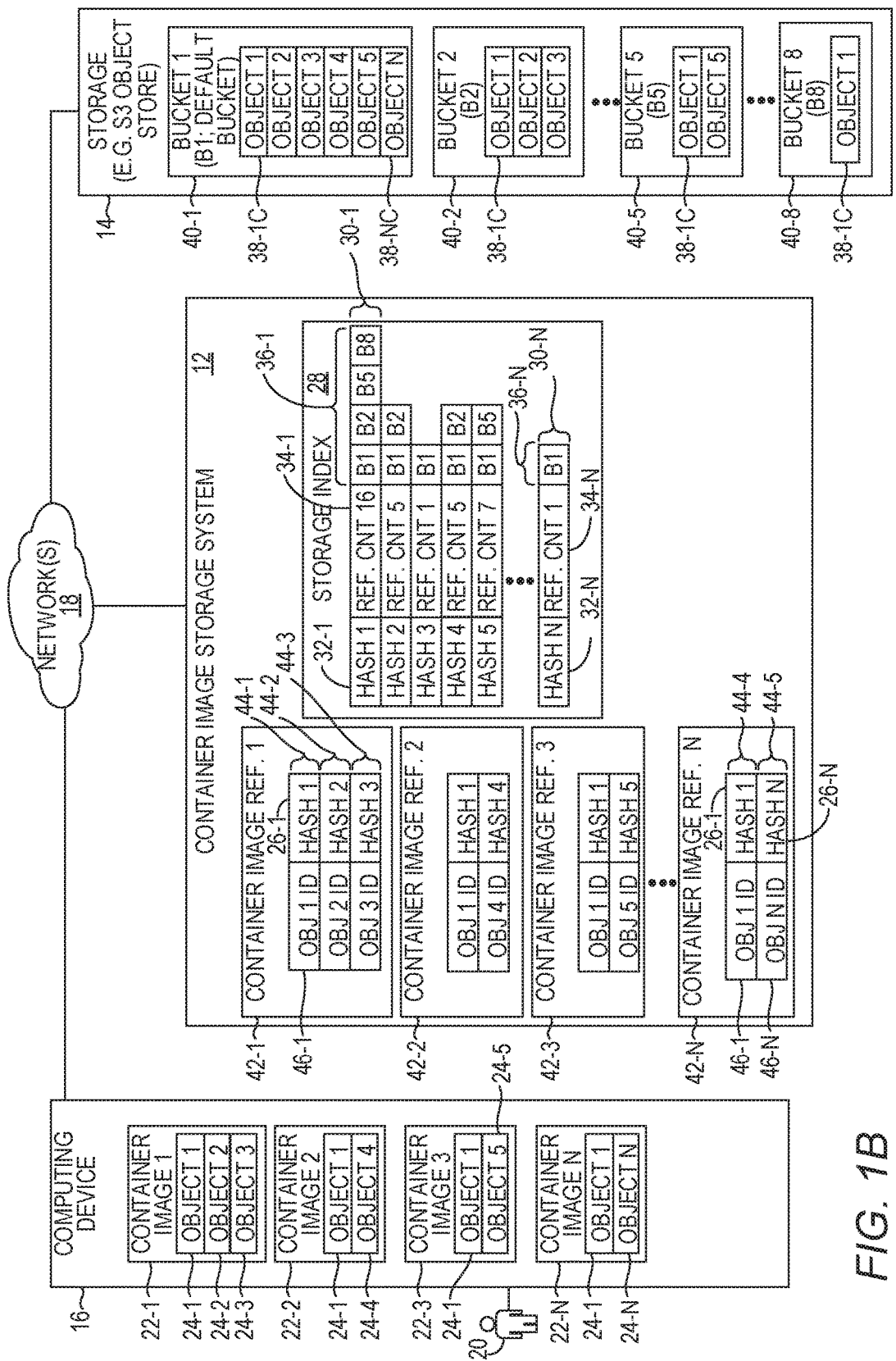
FIG. 1B illustrates the environment illustrated in FIG. 1 at a subsequent point in time when a user stores a container image in the container image storage system.

FIG. 1B illustrates the environment 10 illustrated in FIG. 1 at a subsequent point in time when the user 20 stores the container image 22-N in the container image storage system 12. The container image 22-N contains two objects 24, the object 24-1, and the object 24-N. The container image storage system 12 receives the container image 22-N, extracts the first object 24-1, and generates the hash 26-1 based on the contents of the object 24-1. The container image storage system 12 searches the storage index 28 using the hash 26-1 to determine whether the container image storage system 12 has previously received a container image 22 that included the object 24-1. The container image storage system 12 locates the storage index entry 30-1 that includes the hash 32-1 that matches the hash 26-1. The existence of the storage index entry 30-1 with the hash 32-1 that matches the hash 26-1 means that the container image storage system 12 has previously stored the object 24-1 in the storage 14. The container image storage system 12 increments the reference count 34-1 indicative of how many different container images 22 stored in the container image storage system 12 include the object 24-1.

For purposes of illustration, assume that with the addition of the container image 22-N to the container image storage system 12, the reference count 34-1 now has a value of 16. The container image storage system 12, based on the reference count 34-1, determines a number of copies of the object 24-1 that should be stored in the storage 14. The container image storage system 12 utilizes the logarithmic function having a base of 2 to determine the number of copies of the objects 24 that should be stored in the storage 14. In particular, the container image storage system 12 may use the following formula:

number of copies=$\log_2$(reference count 34-1)
number of copies=$\log_2$(16)
number of copies=4

The container image storage system 12 accesses the list 36-1 that identifies the set of three buckets B1 (bucket 40-1), B2 (bucket 40-2), and B5 (bucket 40-5) in which the object copies 38-1C of the object 24-1 have been stored. Because only three object copies 38-1C of the object 24-1 exist, and the container image storage system 12 has determined that there should now be four object copies 38-1C of the object 24-1 in the storage 14, the container image storage system 12 determines that another object copy 38-1C should be stored in the storage 14. Because each object copy 38-1C should be stored in a separate bucket 40, the container image storage system 12 determines that the additional object copy 38-1C cannot be stored in the buckets 40-1, 40-2, or 40-5 since such buckets already contain an object copy 38-1C. In some examples, the container image storage system 12 may choose to store the additional object copy 38-1C in an existing bucket 40 that does not currently contain the object copy 38-1C. In other examples, the container image storage system 12 may decide to generate a new bucket 40, such as a new bucket 40-8 in the storage 14, and store the additional object copy 38-1C in the new bucket 40-8. The container image storage system 12 may use any desirable criteria in its determination as to whether an additional object copy 38-1C should be stored in an existing bucket 40 or whether a new bucket 40 should be created. For example, the container image storage system 12 may limit each bucket 40 to a predetermined number of object copies 38. Additionally or alternatively, the container image storage system 12 may limit each bucket 40 to a maximum size. The container image storage system 12 modifies the list 36-1 by adding the bucket identifier B8 (bucket 40-8) to the end of the list 36-1.

The container image storage system 12 generates a container image reference 42-N which corresponds to the container image 22-N. The container image storage system 12 generates an image reference record 44-4, which includes the hash 26-1 and the object identifier 46-1 that uniquely identifies the object 24-1.

The container image storage system 12 next extracts the object 24-N and generates a hash 26-N based on the contents of the object 24-N. The container image storage system 12 searches the storage index 28 using the hash 26-N to determine whether the container image storage system 12 has previously received a container image 22 that included the object 24-N. The container image storage system 12 locates a storage index entry 30-N that includes a hash 32-N and that matches the hash 26-N. The existence of the storage index entry 30-N with the hash 32-N that matches the hash 26-N means that the container image storage system 12 has previously stored the object 24-N in the storage 14. The container image storage system 12 increments a reference count 34-N indicative of how many different container images 22 stored in the container image storage system 12 include the object 24-N such that the value of the reference count 34-N is now two.

The container image storage system 12 utilizes the logarithmic function having a base of 2 to determine the number of copies of the objects 24 that should be stored in the storage 14. In particular, the container image storage system 12 may use the following formula:
number of copies=$\log_2$(reference count 34-N)
number of copies=$\log_2$(16)
number of copies=4

The container image storage system 12 utilizes the logarithmic function having a base of 2 to determine a number of object copies 38-NC of the object 24-N that should be stored in the storage 14. In particular, the container image storage system 12 may use the following formula:
number of copies=$\log 2$(reference count 34-N)
number of copies=$\log 2(2)$
number of copies=1

The container image storage system 12 determines that one object copy 38-NC of the object 24-N should be stored in the storage 14. The container image storage system 12 accesses a list 36-N in the storage index entry 30-N and determines that one object copy 38-NC is stored in the bucket B1 (bucket 40-1). Thus, the container image storage system 12 determines that no additional object copies 38-NC of the object 24-N should be stored in the storage 14. The container image storage system 12 generates an image reference record 44-5 which includes the hash 26-N and an object identifier 46-N that uniquely identifies the object 24-N.

Figure 2:
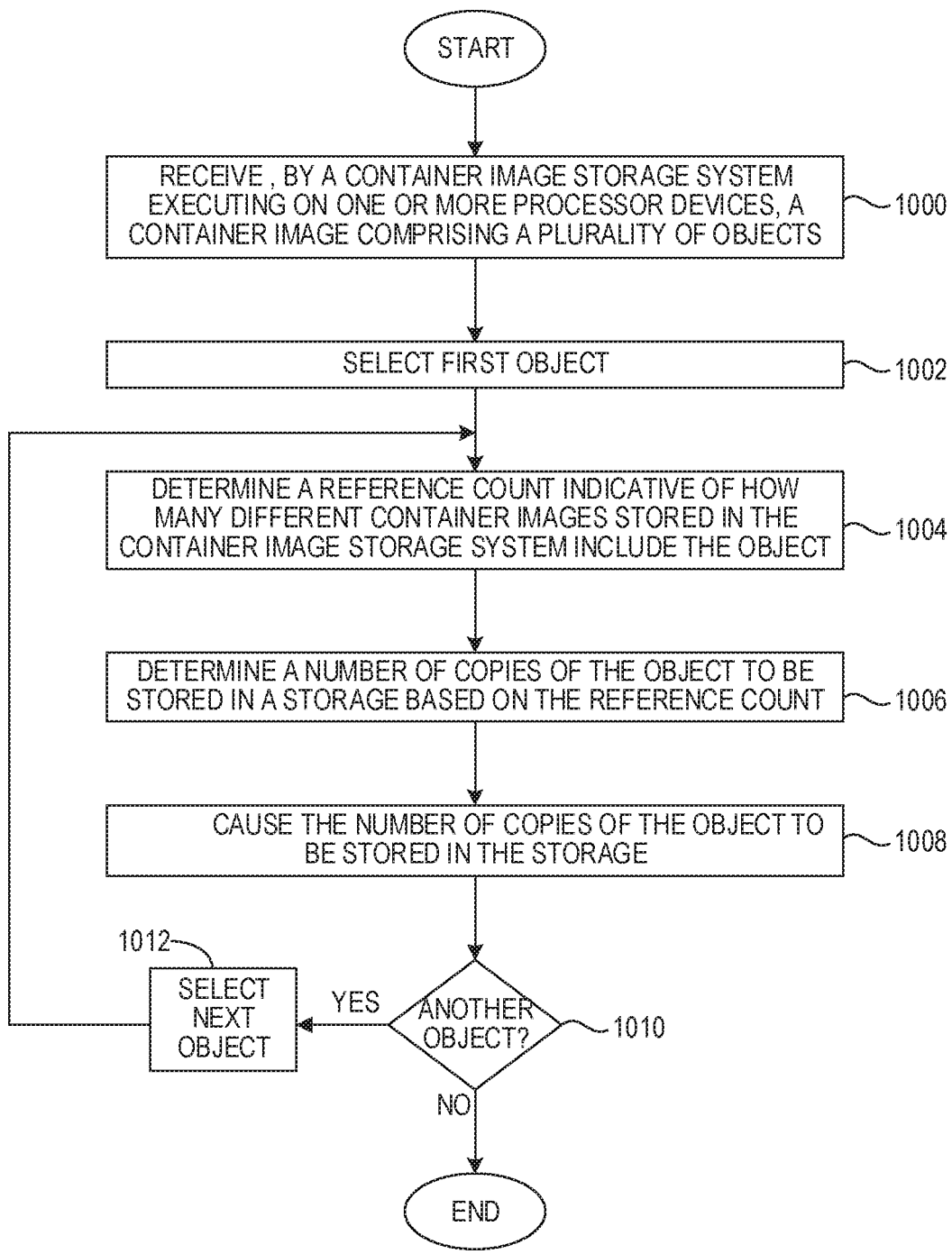
FIG. 2 is a flowchart of a method for scalable object storage with intelligent replication according to one example.

FIG. 2 is a flowchart of a method for scalable object storage with intelligent replication according to one example. FIG. 2 will be discussed in conjunction with FIG. 1A. The container image storage system 12 receives the container image 22-1 comprising objects 24-1, 24-2, 24-3 (FIG. 2, block 1000). The container image storage system 12 selects the first object 24-1 (FIG. 2, block 1002). The container image storage system 12 determines the reference count 34-1 indicative of how many different container images 22 stored in the container image storage system 12 include the object 24-1 (FIG. 2, block 1004). The container image storage system 12 determines a number of object copies 38-1C of the object 24-1 to be stored in the storage 14 based on the reference count 34-1 (FIG. 2, block 1006). The container image storage system 12 causes the number of object copies 38-1C of the object 24-1 to be stored in the storage 14 (FIG. 2, block 1008). The container image storage system 12 determines whether other objects 24 of the container image 22 need to be processed (FIG. 2, block 1010). The container image storage system 12 repeats the previous steps with regard to the objects 24-2 and 24-3 (FIG. 2, blocks 1012, 1004, 1006, 1008). After the final object 24-3 of the container image 22-1 has been processed, the container image storage system 12 finishes the processing with regard to the container image 22-1.

Figure 3:
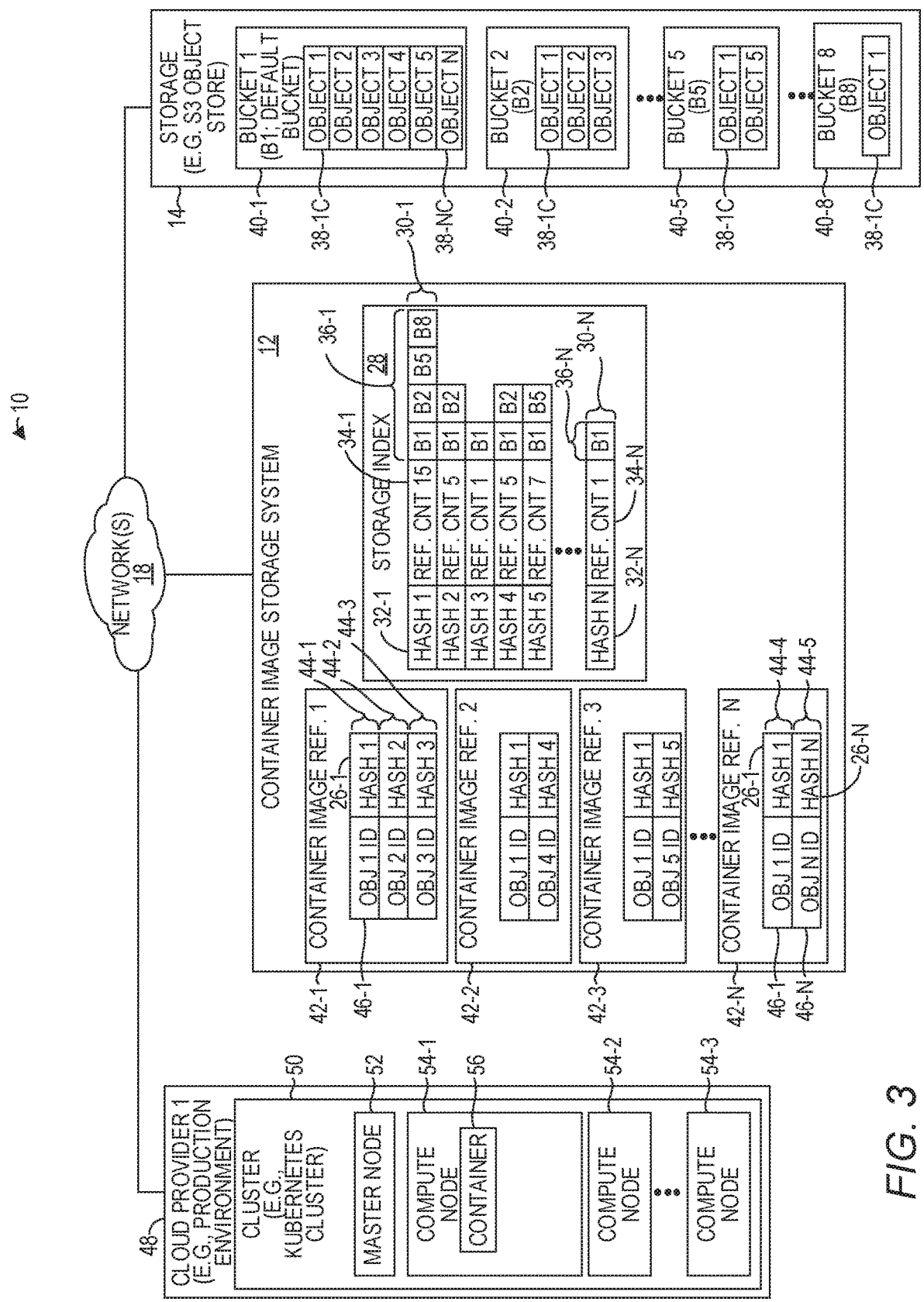
FIG. 3 is a block diagram of the environment illustrated in FIGS. 1A and 1B that illustrates retrieval of container images from the container image storage system according to some examples.

FIG. 3 is a block diagram of the environment 10 illustrated in FIGS. 1A and 1B that illustrates retrieval of container images from the container image storage system 12 during the container image retrieval stage according to some examples. In this example, the computing device 16 has been omitted for purposes of illustration and a production environment 48 has been added. The production environment 48 includes a cluster 50 of nodes suitable for implementing a plurality of containers from container images 22 stored in the container image storage system 12 on an ad hoc, dynamic and scalable basis. In particular, in this example the cluster 50 includes a master node 52 and a plurality of compute nodes 54-1-54-3 on which one or more containers 56 may be initiated.

For purposes of illustration, assume that the master node 52 determines that a container 56 should be initiated from the container image 22-1 (FIG. 1B). The compute node 54-1 indicates to the master node 52 that the compute node 54-1 has the resources to initiate the container 56. The compute node 54-1 requests a copy of the container image 22-1 from the container image storage system 12. The container image storage system 12 accesses the container image reference 42-1 which corresponds to the container image 22-1. The container image storage system 12 accesses the image reference record 44-1 which corresponds to the object 24-1 of the container image 22-1. Based on the image reference record 44-1, the container image storage system 12 accesses the corresponding storage index entry 30-1. The container image storage system 12 accesses the list 36-1 and determines that the bucket B8 (bucket 40-8) is identified at the end of the list 36-1. The container image storage system 12 attempts to access the bucket 40-8 to obtain the object copy 38-1C of the object 24-1. Assume for purposes of illustration that the bucket 40-8 has reached an access limit imposed upon the bucket 40-8 by the storage 14. As an example, assume that the access limit limits the number of accesses to the bucket 40-8 to no more than 100 accesses per second, and that 100 accesses have already been made to the bucket 40-8 in the current one-second period of time. The container image storage system 12 then again accesses the list 36-1 and traverses the list 36-1 in reverse order. Thus the container image storage system 12 next determines that the bucket B5 (bucket 40-5) also contains an object copy 38-1C of the object 24-1. The container image storage system 12 attempts to access the bucket 40-5 to obtain the object copy 38-1C of the object 24-1. Assuming that the bucket 40-5 has not yet reached an access limit imposed upon the bucket 40-5, the container image storage system 12 successfully retrieves the object copy 38-1C of the object 24-1 and sends the object copy 38-1C to the compute node 54-1. The container image storage system 12 repeats this process for the image reference records 44-2 and 44-3 to obtain object copies 38 of the objects 24-2 and 24-3 of the container image 22-1. In this manner, the container image storage system 12 provides the compute node 54-1 a copy of the container image 22-1 so that the compute node 54-1 can initiate a container 56 from the container image 22-1. Moreover, because several object copies 38-1C of the object 24-1 existed in the storage 14, the container image storage system 12 was able to obtain an object copy 38-1C from the bucket 40-5 without delay even though the bucket 40-8 had reached an access limit and could not provide an object copy 38-1C immediately.

Figure 4:
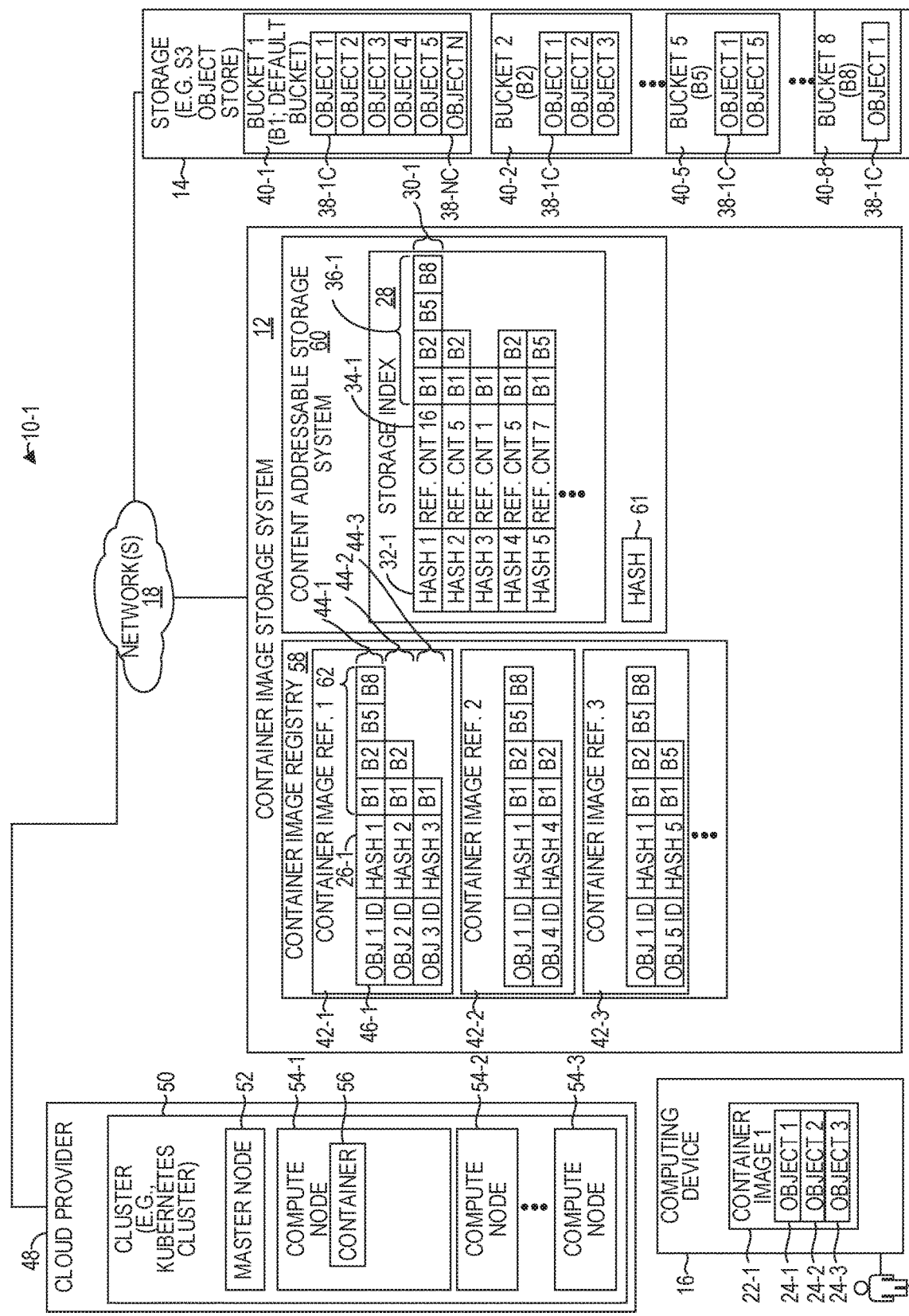
FIG. 4 illustrates an environment according to another embodiment.

FIG. 4 illustrates an environment 10-1 according to another embodiment. The environment 10-1 is substantially similar to the environment 10 discussed above with regard to FIGS. 1-3, except as otherwise noted herein. In this example, the container image storage system 12 comprises a container image registry 58 and a content addressable storage system (CASS) 60. The container image registry 58 interfaces with the production environment 48 to provide the production environment 48 container images 22 upon demand. The container image registry 58 also interfaces with the computing device 16 to receive container images 22 for storing in the container image storage system 12.

As an example, assume the user 20 directs the container image registry 58 to store the container image 22-1 in the container image storage system 12 during the container image storage stage. The container image registry 58 receives the container image 22-1, and generates the container image reference 42-1. The container image registry 58 sends the container image 22-1 to the content addressable storage system 60. The content addressable storage system 60 receives the container image 22-1 and extracts the object 24-1. The content addressable storage system 60 generates a hash 61 based on the contents of the object 24-1. The content addressable storage system 60 accesses the storage index 28 to determine, based on the generated hash 61, whether the object 24-1 has previously been stored by the content addressable storage system 60. The content addressable storage system 60 determines that the hash 61 matches the hash 32-1 and, thus, determines that the object 24-1 has previously been stored. The content addressable storage system 60 increments the reference count 34-1. For purposes of illustration, assume that after incrementing the reference count 34-1 the value of reference count 34-1 is 16. Also assume that at this point in time the list 36-1 comprises the three buckets B1, B2 and B5. The content addressable storage system 60 sends to the container image registry 58 the generated hash 32-1, the reference count 34-1 that indicates there are now 16 container images 22 that utilize the object 24-1, and the list 36-1 that identifies the buckets B1, B2 and B5 as containing copies of the object 24-1.

The container image registry 58 uses the logarithmic function discussed above and the reference count of 16 to determine that four object copies 38-1C of the object 24-1 should be stored by the content addressable storage system 60. The container image registry 58 directs the content addressable storage system 60 to store an additional object copy 38-1C of the object 24-1 in the bucket 40-8 (bucket B8). The container image registry 58 generates a list 62 that identifies the buckets B1, B2, B5 and B8 as buckets 40 that contain an object copy 38-1C of the object 24-1. The content addressable storage system 60 adds the bucket identifier B8 to the list 36-1. The container image registry 58 and the content addressable storage system 60 repeat this process for the objects 24-2 and 24-3. At the end of the process, the container image reference 42-1 contains the information as depicted in FIG. 4. Thus, in addition to including object identifiers 46 and corresponding hashes 26, the container image reference 42-1 includes lists 62 for each object 24 that identifies the buckets 40 in which the respective object copies 38 of the objects 24 are stored.

Assume next that the compute node 54-1 requests from the container image registry 58 the container image 22-1. The container image registry 58 accesses the container image reference 42-1 which corresponds to the container image 22-1. The container image registry 58 accesses the image reference record 44-1 and extracts from the image reference record 44-1 the list 62 that identifies each bucket 40 in which an object copy 38-1C of the object 24-1 has been stored. The container image registry starts at the end of the list 62 and directs the content addressable storage system 60 to obtain an object copy 38-1C from the bucket 40-8 (B8). The content addressable storage system 60 determines that the bucket 40-8 has reached an access limit at the current period of time. The content addressable storage system 60 sends a message to the container image registry 58 indicating that the bucket B8 has reached an access limit. The container image registry traverses the list 62 in reverse order and directs the content addressable storage system 60 to obtain an object copy 38-1C of the object 24-1 from the bucket 40-5. The content addressable storage system 60 determines that the bucket 40-5 has not reached an access limit and obtains an object copy 38-1C of the object 24-1 from the bucket 40-5 and returns the object copy 38-1C to the container image registry 58. The container image registry 58 repeats the process with respect to the objects 24-2 and 24-3. After assembling a container image 22 from the object copies 38 of the objects 24-1, 24-2 and 24-3, the container image registry 58 provides the container image 22 to the compute node 54-1.

Figure 5:
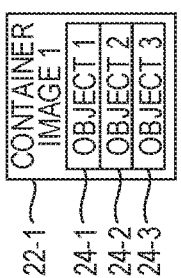
FIG. 5 is a simplified block diagram of the environment illustrated in FIGS. 1A and 1B, according to another example.
Figure 5:
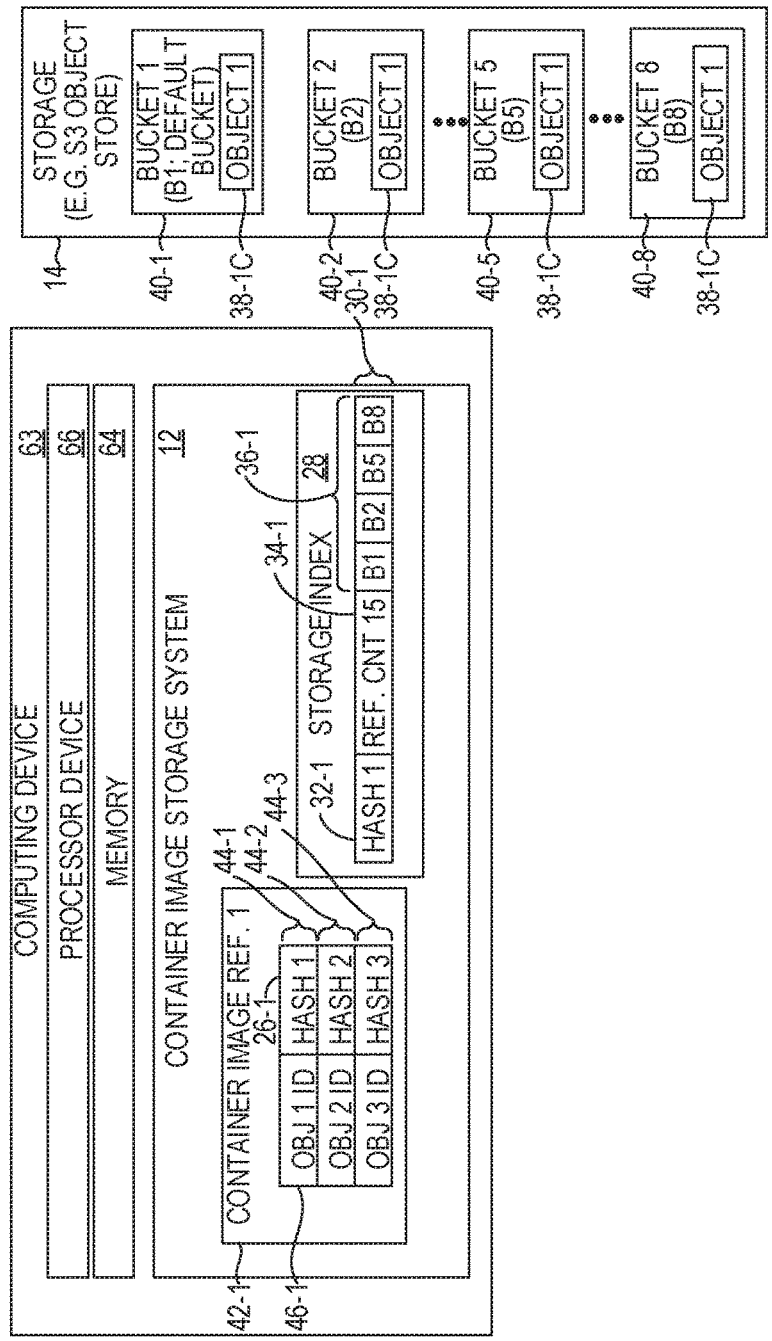

FIG. 5 is a simplified block diagram of the environment 10 illustrated in FIGS. 1A and 1B according to another example. The environment 10 includes a system 61 that includes one or more computing devices 63. The one or more computing devices 63 include one or more memories 64 and one or more processor devices 66 coupled to the one or more memories 64. The container image storage system 12 executes on the one or more computing devices 63. It should be noted that because the container image storage system 12 is a component of the computing device 63, functionality implemented by the container image storage system 12 may be attributed to the computing device 63 generally. Moreover, in examples where the container image storage system 12 comprises software instructions that program the one or more processor devices 66 to carry out functionality discussed herein, functionality implemented by the container image storage system 12 may be attributed herein to the one or more processor devices 66. The processor devices 66 are to receive by the container image storage system 12 the container image 22-1 comprising the plurality of objects 24-1, 24-2, and 24-3. For each object 24, the processor devices 66 are to determine the reference count 34-1 indicative of how many different container images 22 stored in the container image storage system 12 include the object 24. The one or more processor devices 66 are further to determine the number of object copies 38 of the object 24 to be stored in the storage 14 based on the reference count 34-1 and to cause the number of object copies 38 of the object 24 to be stored in the storage 14.

Figure 6:
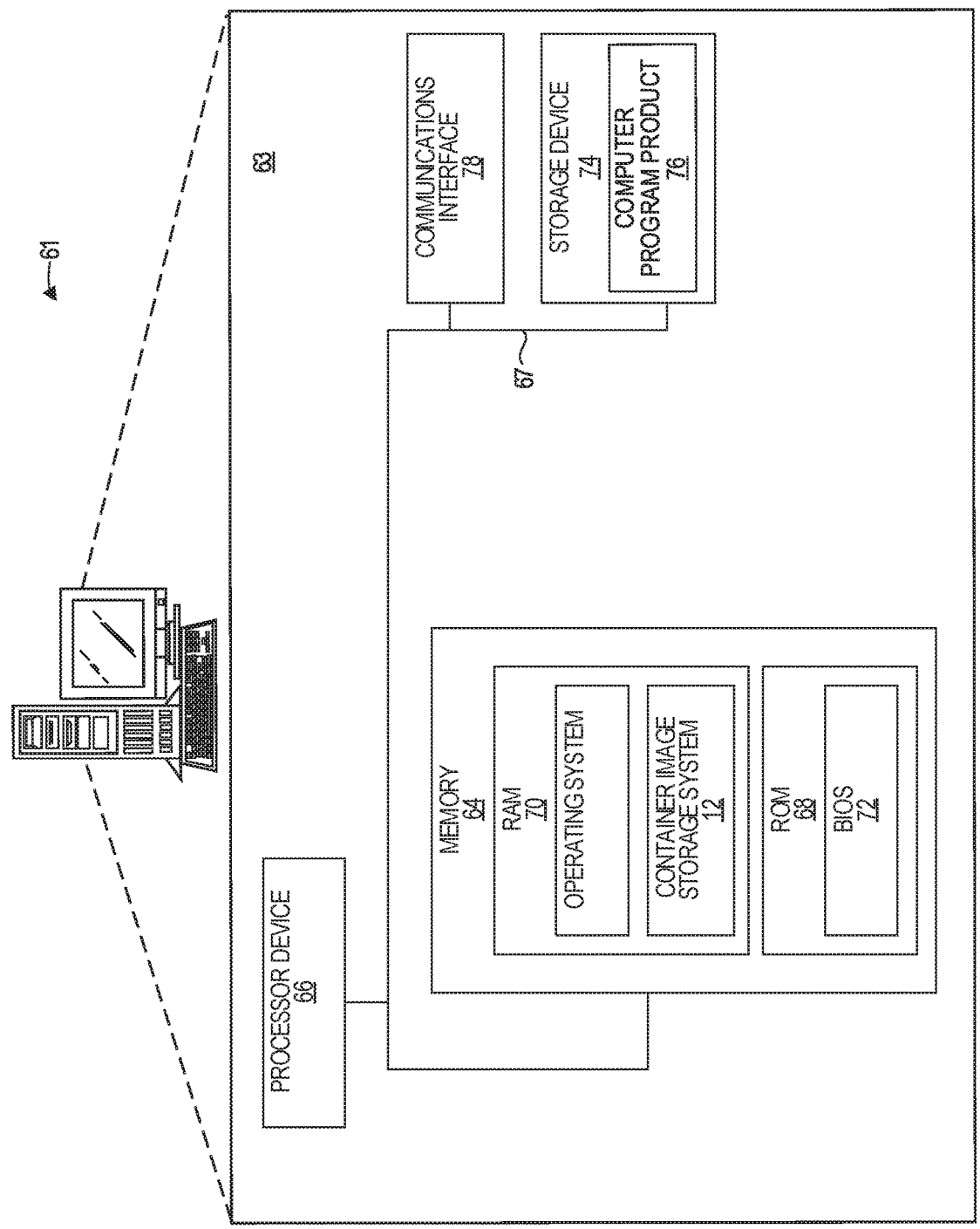
FIG. 6 is a block diagram of a computing device suitable for implementing scalable object storage with intelligent replication according to some examples.

FIG. 6 is a block diagram of the system 61 according to one example. The system 61 includes the computing device 63. The computing device 63 may comprise any computing or electronic device capable of including firmware, hardware, and/or executing software instructions to implement the functionality described herein, such as a computer server, a desktop computing device, a laptop computing device, or the like. The computing device 63 includes the one or more processor devices 66, the one or more memories 64, and a system bus 67. The system bus 67 provides an interface for system components including, but not limited to, the one or more memories 64 and the one or more processor devices 66. The one or more processor devices 66 can be any commercially available or proprietary processor devices.

The system bus 67 may be any of several types of bus structures that may further interconnect to a memory bus (with or without a memory controller), a peripheral bus, and/or a local bus using any of a variety of commercially available bus architectures. The one or more memories 64 may include non-volatile memory 68 (e.g., read-only memory (ROM), erasable programmable read-only memory (EPROM), electrically erasable programmable read-only memory (EEPROM), etc.), and volatile memory 70 (e.g., random-access memory (RAM)). A basic input/output system (BIOS) 72 may be stored in the non-volatile memory 68 and can include the basic routines that help to transfer information between elements within the computing device 63. The volatile memory 70 may also include a high-speed RAM, such as static RAM, for caching data.

The computing device 63 may further include or be coupled to a non-transitory computer-readable storage medium such as a storage device 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 74 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 74 and in the volatile memory 70, including an operating system and one or more program modules, such as the container image storage system 12, which may implement the functionality described herein in whole or in part.

All or a portion of the examples may be implemented as a computer program product 76 stored on a transitory or non-transitory computer-usable or computer-readable storage medium, such as the storage device 74, which includes complex programming instructions, such as complex computer-readable program code, to cause the one or more processor devices 66 to carry out the steps described herein. Thus, the computer-readable program code can comprise software instructions for implementing the functionality of the examples described herein when executed on the one or more processor devices 66. The one or more processor devices 66, in conjunction with the container image storage system 12 in the volatile memory 70, may serve as a controller, or control system, for the computing device 63 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the one or more processor devices 66 through an input device interface that is coupled to the system bus 67 but can be connected by other interfaces such as a parallel port, an Institute of Electrical and Electronic Engineers (IEEE) 1394 serial port, a Universal Serial Bus (USB) port, an IR interface, and the like. The computing device 63 may also include a communications interface 78 suitable for communicating with the network 18 (FIG. 1) as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a container image storage system executing on one or more processor devices, a container image comprising a plurality of objects, the container image configured to initiate a runtime container;
for each object:
determining whether the container image storage system has previously received a container image that included the object;
determining a reference count indicative of how many different container images stored in the container image storage system include the object;
determining a plurality of copies of the object to be stored in a storage based on the reference count; and
causing the plurality of copies of the object to be stored in the storage.

2. The method of claim 1 wherein the storage is organized via a plurality of buckets, each bucket configured to store one or more objects of the plurality of objects, and each bucket having access constraints based on a predetermined number of accesses of the bucket over a predetermined period of time, and wherein causing the plurality of copies of the object to be stored in the storage further comprises causing each copy of the plurality of copies of the object to be stored in a different bucket in the storage.

3. The method of claim 2 further comprising:
for each copy of each object, adding to an object bucket identifier list a bucket identifier that identifies the bucket in which the copy of the object has been stored.

4. The method of claim 2 further comprising:
for a first object of the plurality of objects:
determining that a number N copies of the first object are to be stored in the storage based on the reference count, the number N being greater than 1;
determining that a number N−1 copies of the first object were previously stored in the number N−1 different buckets in the storage;
storing an additional copy in an Nth different bucket; and
adding a bucket identifier that identifies the Nth different bucket to an end of a list of bucket identifiers that identifies each bucket of the N different buckets.

5. The method of claim 4 wherein determining that the number N copies of the first object are to be stored in the storage based on the reference count, N being greater than 1 comprises determining that the number N copies of the first object are to be stored in the storage based on the reference count and a logarithmic function.

6. The method of claim 4 further comprising:
receiving a first request for a container image that includes the first object;
accessing the list of bucket identifiers;
determining a last bucket identifier at the end of the list of bucket identifiers;
determining that the bucket identified by the last bucket identifier has reached an access constraint associated with the bucket and cannot currently be accessed;
iteratively accessing the list of bucket identifiers in reverse order and attempting to obtain the first object from a bucket identified in the list of bucket identifiers that had not currently reached an access constraint associated with the bucket; and
returning the first object.

7. The method of claim 6 further comprising:
receiving a second request for the container image that includes the first object;
accessing the list of bucket identifiers;
determining the last bucket identifier at the end of the list of bucket identifiers;
obtaining the first object from the bucket identified by the last bucket identifier; and
returning the first object.

8. The method of claim 1, wherein the container image storage system comprises a container registry configured to maintain container image information that identifies a reference to each object of each container image stored in the container image storage system, and a content addressable storage system configured to determine a reference count indicative of how many different container images stored in the container image storage system include the object; and wherein:
the content addressable storage system determines the reference count indicative of how many different container images stored in the container image storage system include the object;
the container registry determines the plurality of copies of the object to be stored in the storage based on the reference count; and
the content addressable storage system causes the plurality of copies of the object to be stored in the storage at the direction of the container registry.

9. A system comprising:
one or more memories; and
one or more processor devices coupled to the one or more memories to:
receive, by a container image storage system executing on the one or more processor devices, a container image comprising a plurality of objects, the container image configured to initiate a runtime container;
for each object:
determine whether the container image storage system has previously received a container image that included the object;
determine a reference count indicative of how many different container images stored in the container image storage system include the object;
determine a plurality of copies of the object to be stored in a storage based on the reference count; and
cause the plurality of copies of the object to be stored in the storage.

10. The system of claim 9 wherein the storage is organized via a plurality of buckets, each bucket configured to store one or more objects of the plurality of objects, and each bucket having access constraints based on a predetermined number of accesses of the bucket over a predetermined period of time, and wherein to cause the plurality of copies of the object to be stored in the storage, the one or more processing devices are further to cause each copy of the plurality of copies of the object to be stored in a different bucket in the storage.

11. The system of claim 10 wherein the one or more processor devices are further to:
for each copy of each object, add to an object bucket identifier list a bucket identifier that identifies the bucket in which the copy of the object has been stored.

12. The system of claim 10 wherein the one or more processor devices are further to:
for a first object of the plurality of objects:
determine that a number N copies of the first object are to be stored in the storage based on the reference count, the number N being greater than 1;
determine that a number N−1 copies of the first object were previously stored in the number N−1 different buckets in the storage;
store an additional copy in an Nth different bucket; and
add a bucket identifier that identifies the Nth different bucket to an end of a list of bucket identifiers that identifies each bucket of the N different buckets.

13. The system of claim 12 wherein the one or more processor devices are further to:
receive a first request for a container image that includes the first object;
access the list of bucket identifiers;
determine a last bucket identifier at the end of the list of bucket identifiers;
determine that the bucket identified by the last bucket identifier has reached an access constraint associated with the bucket and cannot currently be accessed;

iteratively access the list of bucket identifiers in reverse order and attempt to obtain the first object from a bucket identified in the list of bucket identifiers that had not currently reached an access constraint associated with the bucket; and return the first object.

14. The system of claim 13 wherein the one or more processor devices are further to:

receive a second request for the container image that includes the first object;

access the list of bucket identifiers;

determine the last bucket identifier at the end of the list of bucket identifiers;

obtain the first object from the bucket identified by the last bucket identifier; and return the first object.

15. The system of claim 9 wherein the storage is organized via a plurality of buckets, and wherein the one or more processor devices are further to:

cause the plurality of copies of the object to be stored in different buckets of the plurality of buckets;

subsequently receive a request for a container image that includes the object;

determine a set of buckets of the plurality of buckets in which a copy of the object has been stored;

determine that a particular bucket in the set of buckets has reached an access constraint associated with the particular bucket and cannot currently be accessed;

obtain the object from a bucket in the set of buckets other than the particular bucket; and return the object.

16. A computer program product stored on a non-transitory computer-readable storage medium and including instructions configured to cause one or more processor devices to:

receive, by a container image storage system executing on the one or more processor devices, a container image comprising a plurality of objects, the container image configured to initiate a runtime container;

for each object:
determine whether the container image storage system has previously received a container image that included the object;

determine a reference count indicative of how many different container images stored in the container image storage system include the object;

determine a plurality of copies of the object to be stored in a storage based on the reference count, wherein the storage is organized via a plurality of buckets, each bucket having access constraints based on a predetermined number of accesses of the bucket over a predetermined period of time; and cause each copy of the plurality of copies of the object to be stored in a different bucket in the storage.

17. The computer program product of claim 16 wherein the instructions further cause the one or more processor devices to:

for each copy of each object, add to an object bucket identifier list a bucket identifier that identifies the bucket in which the copy of the object has been stored.

18. The computer program product of claim 16 wherein the instructions further cause the one or more processor devices to:

for a first object of the plurality of objects:
determine that a number N copies of the first object are to be stored in the storage based on the reference count, the number N being greater than 1;

determine that a number N−1 copies of the first object were previously stored in the number N−1 different buckets in the storage;

store an additional copy in an Nth different bucket; and add a bucket identifier that identifies the Nth different bucket to an end of a list of bucket identifiers that identifies each bucket of the N different buckets.

19. The computer program product of claim 18 wherein the instructions further cause the one or more processor devices to:

receive a first request for a container image that includes the first object;

access the list of bucket identifiers;

determine a last bucket identifier at the end of the list of bucket identifiers;

determine that the bucket identified by the last bucket identifier has reached an access constraint associated with the bucket and cannot currently be accessed;

iteratively access the list of bucket identifiers in reverse order and attempt to obtain the first object from a bucket identified in the list of bucket identifiers that had not currently reached an access constraint associated with the bucket; and return the first object.

20. The computer program product of claim 19 wherein the instructions further cause the one or more processor devices to:

receive a second request for the container image that includes the first object;

access the list of bucket identifiers;

determine the last bucket identifier at the end of the list of bucket identifiers;

obtain the first object from the bucket identified by the last bucket identifier; and return the first object.

* * * * *